United States Patent
Han et al.

(10) Patent No.: US 9,508,189 B2
(45) Date of Patent: Nov. 29, 2016

(54) METHOD AND APPARATUS FOR CREATING 3D IMAGE OF VEHICLE SURROUNDINGS

(71) Applicant: KSS-IMAGENEXT CO., LTD., Seongnam-si, Gyeonggi-do (KR)

(72) Inventors: Young-In Han, Yongin-si (KR); Sung-Je Cheon, Yongin-si (KR); Jong-Woon Park, Seoul (KR); Won-In Baek, Seongnam-si (KR)

(73) Assignee: KSS-IMAGENEXT CO., LTD., Seongham-Si, Gyeonggi-Do (KR)

( * ) Notice: Subject to any disclaimer, the term of this patent is extended or adjusted under 35 U.S.C. 154(b) by 213 days.

(21) Appl. No.: 14/361,546

(22) PCT Filed: Sep. 27, 2012

(86) PCT No.: PCT/KR2012/007781
§ 371 (c)(1),
(2) Date: May 29, 2014

(87) PCT Pub. No.: WO2013/081287
PCT Pub. Date: Jun. 6, 2013

(65) Prior Publication Data
US 2014/0347450 A1    Nov. 27, 2014

(30) Foreign Application Priority Data

Nov. 30, 2011    (KR) ........................ 10-2011-0127209

(51) Int. Cl.
*H04N 7/18*        (2006.01)
*G06T 15/20*      (2011.01)
(Continued)

(52) U.S. Cl.
CPC ............... *G06T 15/205* (2013.01); *B60R 1/00* (2013.01); *G06K 9/00805* (2013.01);
(Continued)

(58) Field of Classification Search
CPC ............. B60R 1/00; B60R 2300/602; B60R 2300/605; B60R 2300/607; B60R 2300/102; B60R 2300/105; B60R 2300/303; B60R 2300/305; G06T 15/205; G06T 2215/16; G06T 3/00; G06T 3/0031; G06T 3/4038; G06T 2207/30236; G06T 2207/30248; G06T 2207/30252; G06T 2207/30256; G06T 2207/30261; G06T 2207/30264; G06T 2207/30268; G08G 1/16; H04N 13/0007; H04N 13/0282; H04N 7/181; G06K 9/00778; G06K 9/00785; G06K 9/00791; G06K 9/00798; G06K 9/00805; G06K 9/00812; G06K 9/00818; G06K 9/00825; G06K 9/00832; G06K 9/00845; G06K 9/325; G06K 2209/15; G60R 2300/806
USPC ............. 348/148, 47, 48, 118; 701/300, 301
See application file for complete search history.

(56) References Cited

U.S. PATENT DOCUMENTS

| | | | |
|---|---|---|---|
| 6,593,960 B1 * | 7/2003 | Sugimoto | ............... B60R 11/04 348/142 |
| 7,161,616 B1 | 1/2007 | Okamoto et al. | |

(Continued)

FOREIGN PATENT DOCUMENTS

| | | |
|---|---|---|
| CN | 1344470 A | 4/2002 |
| CN | 1880918 A | 12/2006 |

(Continued)

*Primary Examiner* — Sath V Perungavoor
*Assistant Examiner* — Nathnael Aynalem
(74) *Attorney, Agent, or Firm* — Rabin & Berdo, P.C.

(57) ABSTRACT

The present invention relates to a method and apparatus for creating a 3D image of vehicle surroundings. The method according to the present invention includes the steps of: mapping images captured by a plurality of cameras installed in a vehicle to a virtual plane defined by a 3-dimensional space model having a container shape with a flat bottom surface and a top surface which has an increasing radius; and creating a view image having a viewpoint of a virtual camera by using the image mapped to the virtual plane. According to the present invention, it is advantageous that an image of vehicle surroundings including surrounding obstacles can be expressed naturally and three-dimensionally. It is also advantageous that an optimal image of vehicle surroundings can be provided by changing the virtual viewpoint according to a traveling state of the vehicle. There is also the advantage that a user can conveniently adjust the viewpoint of the virtual camera.

11 Claims, 12 Drawing Sheets

(51) Int. Cl.
   *B60R 1/00* (2006.01)
   *G06K 9/00* (2006.01)
   *H04N 13/00* (2006.01)
   *H04N 13/02* (2006.01)
   *G06T 3/00* (2006.01)
   *G06T 3/40* (2006.01)
   *G08G 1/16* (2006.01)

(52) U.S. Cl.
   CPC .......... *G06T 3/0031* (2013.01); *G06T 3/4038* (2013.01); *H04N 13/0007* (2013.01); *H04N 13/0282* (2013.01); *B60R 2300/602* (2013.01); *B60R 2300/605* (2013.01); *B60R 2300/607* (2013.01); *G06T 2215/16* (2013.01); *G08G 1/16* (2013.01); *H04N 7/181* (2013.01)

(56) References Cited

U.S. PATENT DOCUMENTS

| | | | | |
|---|---|---|---|---|
| 7,307,655 B1* | 12/2007 | Okamoto | ........... | G06K 9/00791 348/222.1 |
| 7,728,869 B2 | 6/2010 | Jung | | |
| 8,319,618 B2* | 11/2012 | Gomi | ........ | B60R 1/00 340/435 |
| 8,576,285 B2* | 11/2013 | Gomi | ........ | B60R 1/00 348/113 |
| 8,941,737 B2* | 1/2015 | Ozaki | ........ | B60R 1/00 348/148 |
| 2003/0085999 A1* | 5/2003 | Okamoto | ........ | B60R 1/00 348/148 |
| 2003/0122930 A1* | 7/2003 | Schofield | ........ | B60R 1/00 348/148 |
| 2004/0260469 A1* | 12/2004 | Mizusawa | ........ | B60R 1/00 701/300 |
| 2006/0227138 A1 | 10/2006 | Oizumi | | |
| 2008/0043113 A1* | 2/2008 | Ishii | ........ | G06T 3/4038 348/218.1 |
| 2008/0304705 A1* | 12/2008 | Pomerleau | ........ | B60R 1/00 382/103 |
| 2010/0134325 A1 | 6/2010 | Gomi et al. | | |
| 2011/0074916 A1 | 3/2011 | Demirdjian | | |
| 2011/0234801 A1* | 9/2011 | Yamada | ........ | B60R 1/00 348/148 |
| 2012/0068840 A1 | 3/2012 | Ozaki et al. | | |
| 2012/0087546 A1* | 4/2012 | Focke | ........ | B60R 1/00 382/104 |

FOREIGN PATENT DOCUMENTS

| | | |
|---|---|---|
| JP | 2006-287826 A | 10/2006 |
| JP | 2010-128951 A | 6/2010 |
| JP | 2010-185761 A | 8/2010 |
| JP | 2010-274814 A | 12/2010 |
| KR | 10-2001-0112433 A | 12/2001 |
| KR | 10-2006-0130425 A | 12/2006 |
| KR | 10-2010-0005971 A | 1/2010 |
| WO | WO 00-64175 A1 | 10/2000 |

* cited by examiner

METHOD AND APPARATUS FOR CREATING 3D IMAGE OF VEHICLE SURROUNDINGS

TECHNICAL FIELD

The present invention relates to a method and apparatus for creating an image of vehicle surroundings, and more particularly, to a method and apparatus for creating and providing an image of vehicle surroundings three-dimensionally.

BACKGROUND ART

With the development of car industry, cars have been widely distributed to the extent that a household owns at least one car, and various high-tech electronic technologies are applied to the cars to improve safety of cars and promote driver's convenience.

Such high-tech electronic technologies include a vehicle surrounding image display system (e.g., Around View Monitoring (AVM)) for allowing a driver to easily check surroundings of a vehicle with his/her naked eyes by capturing surrounding of the vehicle and displaying a captured image. The vehicle surrounding image display system captures surroundings via cameras installed on the front, rear, left, and right of the vehicle, corrects an overlapping area to be seen naturally based on the captured images, and displays an image of the surroundings of the vehicle on a screen. Accordingly, the driver can exactly recognize the surroundings of the vehicle by viewing the image of the surroundings and can easily park the vehicle without viewing a side view mirror or a rear view mirror.

In particular, a 3-dimensional (3D) vehicle surrounding image providing system for providing an image of vehicle surroundings as a view image viewed from various viewpoints is in the spotlight. More specifically, techniques for enabling the driver to recognize the surroundings of the vehicle more easily by changing at least one of a location of a virtual viewpoint of a combined image, a direction of the eyes, and a focal distance according to a vehicle driving condition have been studied and developed.

In order to provide such a 3D image of vehicle surroundings, a general method maps the image captured by the camera to a 3D space virtual plane by using a 3D space model. In addition, the method creates a combined image based on the input image mapped to the 3D space virtual plane according to a corresponding relationship which is pre-defined according to a location of a camera virtual viewpoint, a direction of the eyes, and a focal distance which are defined according to a vehicle driving condition or a user selection. However, there is a problem that the combined image is not naturally seen according to the 3D space model. For example, when a hemisphere model may be used as the 3D space model, objects located at a long distance from the vehicle may be expressed naturally, but the ground surface around the vehicle is not expressed naturally. In addition, when the ground surface used in the related-art 2D vehicle surrounding image system is used as the mapping surface, objects other than the ground surface, for example, persons or obstacles standing around the vehicle have lengthened images and thus a normal image cannot obtained. In addition, since the view images are not well matched with real camera images during the matching process, there is a problem that it is difficult to match the images.

DISCLOSURE

Technical Problem

An aspect of the present invention is to solve at least the above-mentioned problems and/or disadvantages and to provide at least the advantages described below. Accordingly, an aspect of the present invention is to provide a method and apparatus for creating a 3D image of vehicle surroundings, which can express an image of vehicle surroundings including obstacles more naturally and 3-dimensionally.

Technical Solution

According to an aspect of an exemplary embodiment, there is provided a method for creating a 3D image of vehicle surroundings, the method including: mapping images captured by a plurality of cameras installed in a vehicle to a virtual plane defined by a 3D space model of a vessel shape which has a flat bottom surface and a radius increasing toward a top; and creating a view image of a viewpoint of a virtual camera by using the images mapped to the virtual plane.

The viewpoint of the virtual camera may be determined according to at least one of a driving condition of the vehicle and a user selection.

A size of the bottom surface of the 3D space model may be in inverse proportion to a driving speed of the vehicle.

The view image may be created with reference to a lookup table in which a corresponding relationship between the image mapped to the virtual plane and the view image of the viewpoint of the virtual camera is pre-defined.

A center of an area where the images captured by the plurality of cameras to create the view image overlap with one another may be changed according to a tilt angle of the virtual camera.

The plurality of cameras may include a front camera, a right camera, a rear camera, and a left camera installed on a front, a right, a rear, and a left of the vehicle, respectively, and the center of the overlapping area may be changed to further include an image captured by a camera installed on a location where the virtual camera is located according to how far the virtual camera is distanced from a center of the vehicle to the left or right.

The viewpoint of the virtual camera may interwork with a steering angle direction or a gear location of the vehicle.

The method may further include: displaying a UI for receiving a user selection regarding the viewpoint of the virtual camera; and displaying a change in the viewpoint of the virtual camera according to a user selection input through the UI.

The method may further include adding information on buildings and roads around a driving location of the vehicle to the view image according to the viewpoint of the virtual camera.

A computer-readable medium according to another exemplary embodiment of the present invention may record a program for executing one of the above-described methods in a computer.

According to an aspect of an exemplary embodiment, there is provided a system for displaying an image of vehicle surroundings, the system including a surrounding image creating apparatus configured to receive images captured by a plurality of cameras installed in a vehicle, map the images to a virtual plane defined by a 3D space model of a vessel shape which has a flat bottom surface and a radius increasing toward a top, and create a view image viewed from a viewpoint of a virtual camera by using the images mapped to the virtual plane.

The surrounding image creating apparatus may add information on buildings and roads around a driving location of the vehicle to the view image according to the viewpoint of the virtual camera.

The plurality of cameras may transmit the captured images to the surrounding image creating apparatus via short-range wireless communication.

Advantageous Effects

According to the present invention, the method and apparatus has the advantage of expressing the image of vehicle surroundings including surrounding obstacles more naturally and 3-dimensionally. In addition, the method and apparatus has the advantage of providing an optimal image of vehicle surroundings by changing the virtual viewpoint according to a vehicle driving condition. In addition, the user can easily adjust the viewpoint of the virtual camera.

BEST MODE

Figure 1:
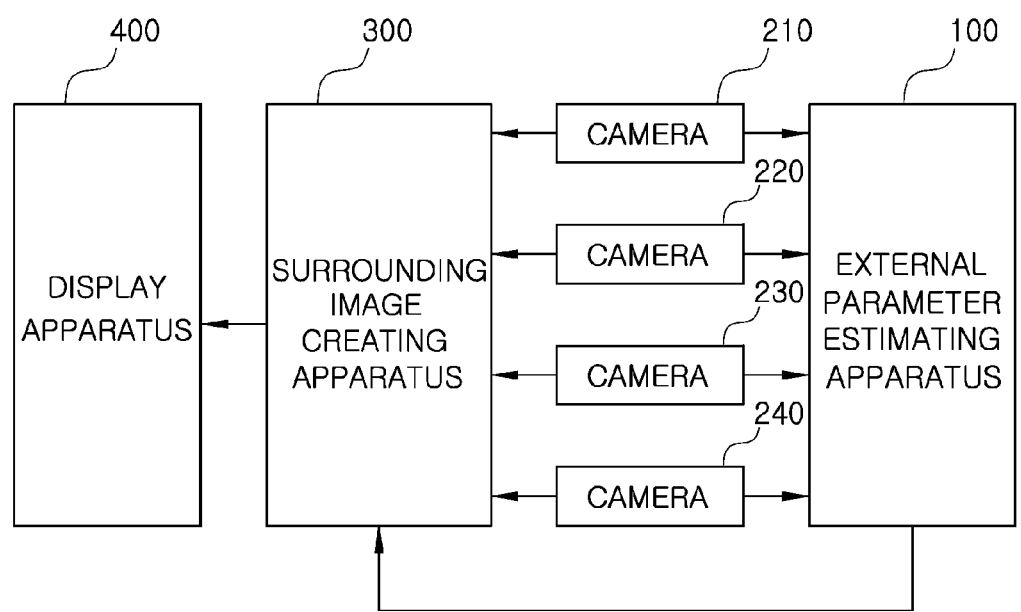
FIG. 1 is a block diagram illustrating a vehicle surrounding image display system including an external parameter estimating apparatus according to an exemplary embodiment of the present invention.

Reference will now be made in detail to the embodiment of the present general inventive concept, examples of which are illustrated in the accompanying drawings, wherein like reference numerals refer to the like elements throughout. The embodiment is described below in order to explain the present general inventive concept by referring to the drawings.

FIG. 1 is a block diagram to illustrate a vehicle surrounding image display system including an external parameter estimating apparatus according to an exemplary embodiment of the present invention.

Referring to FIG. 1, the vehicle surrounding image display system includes four cameras 210, 220, 230, and 240, a surrounding image creating apparatus 300, and a display apparatus 400, and may further include an external parameter estimating apparatus 100. Of course, the surrounding image creating apparatus 300 and the external parameter estimating apparatus 100 may be integrated into a single element.

The vehicle surrounding image display system refers to a system which displays on a screen an image of surroundings which is created by processing images captured by the four cameras 210, 220, 230, and 240 installed in the vehicle, thereby allowing a driver to check surroundings of the vehicle. The vehicle surrounding image display system may provide the image of vehicle surroundings as a 3D image viewed from a virtual viewpoint. To achieve this, external parameters regarding positions and locations of the four cameras 210, 220, 230, and 240 installed in the vehicle should be known.

The four cameras 210, 220, 230, and 240 are installed on the front, rear, left, and right of the vehicle, respectively, and may include a lens having a great angle of view such as a wide-angle lens, a fisheye lens, etc. The cameras 210, 220, 230, and 240 capture 3D subjects as 2D images through the lens, and provide the captured images to the external parameter estimating apparatus 100 and the surrounding image creating apparatus 300. According to an exemplary embodiment, the cameras 210, 220, 230, and 240 may have a short-range wireless communication module such as Wi-Fi, Bluetooth, Zigbee, and Ultra Wide Band (UWB) mounted thereon, and may be configured to wirelessly transmit the images to the surrounding image creating apparatus 300 and the external parameter estimating apparatus 100.

The external parameter estimating apparatus 100 may extract apexes forming a triangle pattern from the images provided by the four cameras 210, 220, 230, and 240, and may estimate external parameters of the cameras 210, 220, 230, and 240 by using the extracted apexes. The method for estimating the external parameters will be explained in detail below.

The surrounding image creating apparatus 300 may create a virtual viewpoint image for a virtual camera having a predetermined virtual viewpoint defined according to a vehicle driving condition or a user selection, by using the images provided by the four cameras 210, 220, 230, and 240, and may output the virtual viewpoint image to the display apparatus 400. To achieve this, the surrounding image creating apparatus 300 may obtain a texture map by mapping the input images provided by the cameras 210, 220, 230, and 240 to a 3D model plane. The texture map may be obtained by using a projection model for each camera, which is obtained based on the camera external parameters obtained by the external parameter estimating apparatus 100. In addition, a weighted blending technique may be used to naturally express the input images captured by the different cameras during the process of mapping the input images to the 3D model virtual plane. When the predetermined virtual viewpoint is defined, the surrounding image creating apparatus 300 may create the virtual viewpoint image from the texture map by using the projection model of the virtual camera having the corresponding virtual viewpoint, and may output the virtual viewpoint image.

The display apparatus 400 displays the image of surroundings on a display module such as a Liquid Crystal Display (LCD), an Organic Light Emitting Diode (OLED), etc. Of course, a navigation system (not shown) installed in the vehicle may receive the image of surroundings and may display it on the screen.

According to an exemplary embodiment, the surrounding image creating apparatus 300, the external parameter estimating apparatus 100, and the display apparatus 400 may be implemented by using a portable communication terminal such as a smartphone, a tablet PC, etc.

An operation for correcting a lens distortion of the four cameras 210, 220, 230, and 240 and an operation for obtaining the projection model for each camera may be required. These operations may be performed by using well-known methods and thus a detailed description thereof is omitted.

Mode for Embodying the Invention

Hereinafter, a method for estimating external parameters of cameras installed in a vehicle by using a triangle pattern according to an exemplary embodiment of the present invention will be explained.

Figure 2:
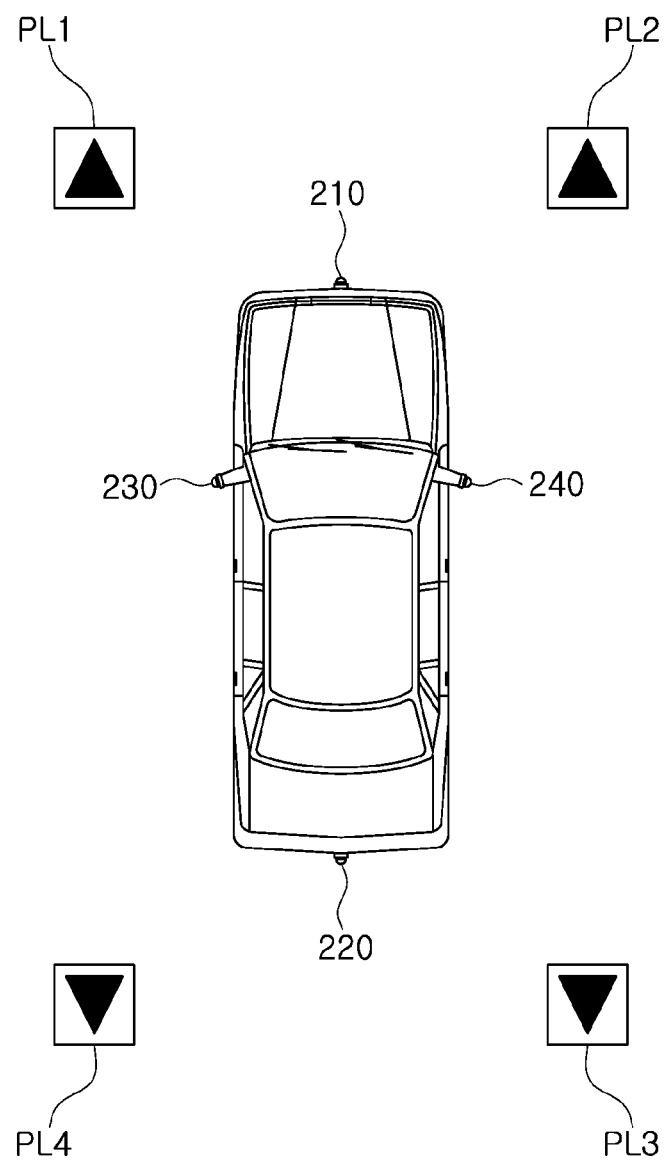
FIG. 2 is a schematic view to illustrate installation locations of cameras and arrangements of correction plates marked with triangle patterns according to an exemplary embodiment of the present invention.

FIG. 2 is a schematic view illustrating installation locations of cameras and arrangements of correction plates marked with triangle patterns according to an exemplary embodiment of the present invention.

Referring to FIGS. 1 and 2, the cameras 210, 220, 230, and 240 may be installed on the front, rear, left, and right of the vehicle (V), respectively. More specifically, the camera 210 of the front may be installed on a center of a bonnet of the vehicle (V), and the cameras 230 and 240 of the left and right may be installed on an edge or a bottom of each side view mirror of the vehicle (V). In addition, the camera 220 of the rear may be installed on a center of a top of a rear bumper. Since the scale and image quality of the image captured by the camera depends on the height and angle of the camera, the cameras 210 and 220 installed on the front and rear may have the same height. Likewise, the cameras 230 and 240 installed on the left and right may have the same height. By setting the cameras 210, 220, 230, and 240 to have the same height, phenomena in which the lane widths are not equally expressed in an overlapping area and surrounding objects are seen as having different sizes from real sizes when the image of surroundings is created can be minimized. In addition, the cameras 230 and 240 installed on the left and right may be installed to capture images located at more than 170° with reference to a line perpendicular to a ground direction. The installation location of each of the cameras 210, 220, 230, and 240 may be different according to a kind of vehicle and there may be restrictions in installing the cameras due to a design of the vehicle.

It is common that the wide-angle lens causes image quality to deteriorate due to an insufficient amount of light around the lens and more distortion occurs at a surrounding portion of the lens than a center portion. In addition, the image quality of the image of the surrounding portion may greatly be undermined when the viewpoint of the image captured by the camera is changed. Accordingly, in order to use the image formed on the center area of the camera lens, the cameras 210 and 220 installed on the front and rear may be installed to have their optical axes parallel to the horizontal line, and the cameras 230 and 240 installed on the left and right may be installed to have their optical axes perpendicular to the ground. In addition, installation heights of the cameras 210, 220, 230, and 240 may be determined so that objects located within about 1.5 m from the front and rear and the left and right of the vehicle (V) can be captured. In this case, the cameras 210, 220, 230, and 240 may be installed to be able to capture objects located within about 30° to 60° with reference to the perpendicular axis to the ground. The installation locations of the cameras described above are merely an example and the cameras 210, 220, 230, and 240 are not necessarily installed in the corresponding locations for the camera external parameter estimating apparatus 100 according to the exemplary embodiments of the present invention.

The correction plates PL1, PL2, PL3, and PL4 marked with the triangle pattern may be disposed at a predetermined distance from corners of the vehicle (V) so that each image captured by the cameras 210, 220, 230, and 240 includes two correction plates. That is, the correction plates PL1, PL2, PL3, and PL4 are installed at the predetermined distance from the respective corners of the vehicle (V), so that the image captured by the front cameras 210 includes the correction plates PL1 and PL2, the image captured by the rear camera 220 includes the correction plates PL3 and PL4, the image captured by the left camera 230 includes the correction plates PL1 and PL4, and the image captured by the right camera 240 includes the correction plates PL2 and PL3. The correction plates PL1, PL2, PL3, and PL4 may substantially be installed on the front left, front right, rear right, and rear left of the vehicle (V), respectively. However, the correction plates PL1, PL2, PL3, and PL4 are not necessarily installed on the pre-defined locations. However, the correction plates PL1, PL2, PL3, and PL4 should be placed in parallel with the ground where the vehicle (V) is located.

In addition, the correction plates PL1, PL2, PL3, and PL4 may be marked with equilateral triangle pattern having constant thickness. The size of the inner triangle is 0.4~0.8 times the size of the outer triangle. This is to exactly and automatically extract the triangle patterns marked on the correction plates PL1, PL2, PL3, and PL4 from similar triangle patterns around the vehicle (V). However, this should not be considered as limiting. The correction plates PL1, PL2, PL3, and PL4 may be implemented in various forms that can extract apexes of the equilateral triangle.

Figure 3A:
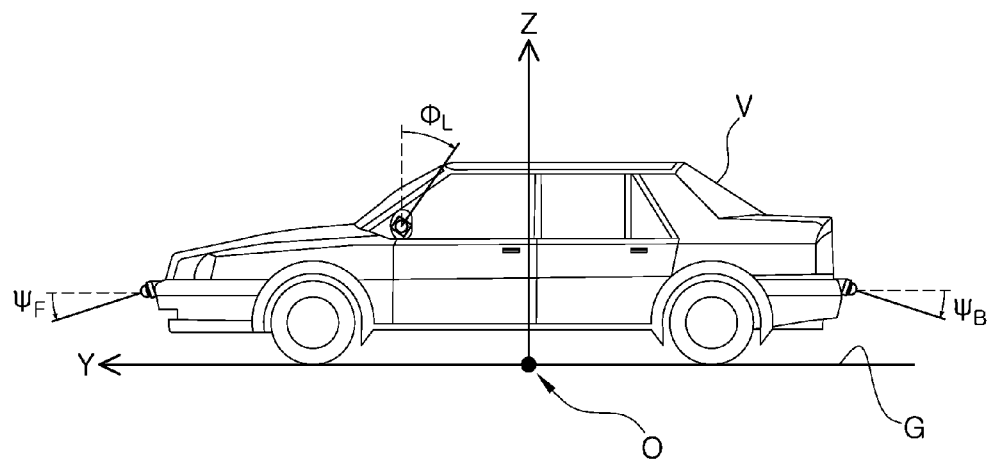
FIGS. 3A and 3B are views to illustrate external parameters of cameras installed in a vehicle according to an exemplary embodiment of the present invention.
Figure 3B:
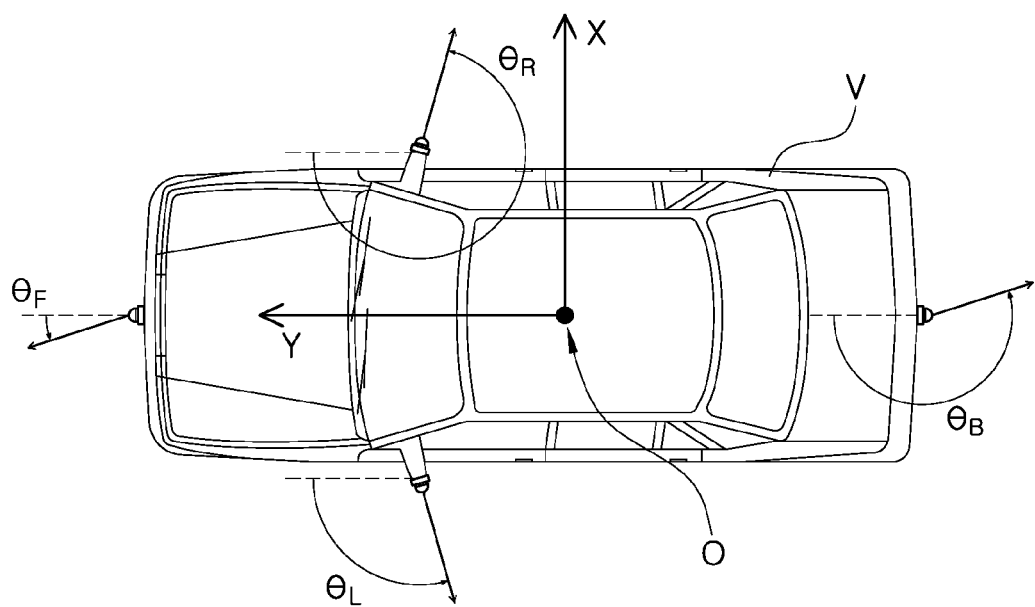

FIGS. 3A and 3B are schematic views to illustrate external parameters of cameras installed in a vehicle according to an exemplary embodiment of the present invention.

Referring to FIG. 3, external parameters of the cameras 210, 220, 230, and 240 installed in the vehicle (V) include 3D space coordinates (x, y, z), and pan, tilt, and roll angles ($\theta$, $\Psi$, $\Phi$) of the cameras 210, 220, 230, and 240.

From among the 3D space coordinates (x, y, z), the z-coordinate may correspond to a height from the ground (G) where the vehicle (V) is located, and the heights of the front camera 210, the left camera 230, and the right camera 240 may be $z_F$, $z_L$, and $z_B$, respectively, as shown in FIG. 3A. In addition, the x-coordinate and the y-coordinate may correspond to a location on a virtual plane parallel to the ground (G) where the vehicle (V) is located, and the center (O) of the vehicle (V) may be a coordinate reference as shown in FIG. 3B.

The pan angle (θ) may be defined by an angle formed by a head direction of the cameras 210, 220, 230, and 240 and an advancing direction of the vehicle (V), and the pan angles of the cameras 210, 220, 230, and 240 may have values of $\theta_F$, $\theta_B$, $\theta_L$, and $\theta_R$, respectively, as shown in FIG. 3B.

The tilt angle (Ψ) may be defined by an angle formed by the head direction of the cameras 210, 220, 230, and 240 and the ground (G). The tilt angles of the front camera 210 and the rear camera 220 may have values of $\Psi_F$ and $\Psi_B$, respectively, as shown in FIG. 3A.

The roll angle (Φ) may be defined by a rotation angle of the cameras 210, 220, 230, and 240 with reference to a camera head direction axis, and the roll angle of the left camera 230 may have a value of $\Phi_L$ as shown in view (a) of FIG. 3A.

Figure 4:
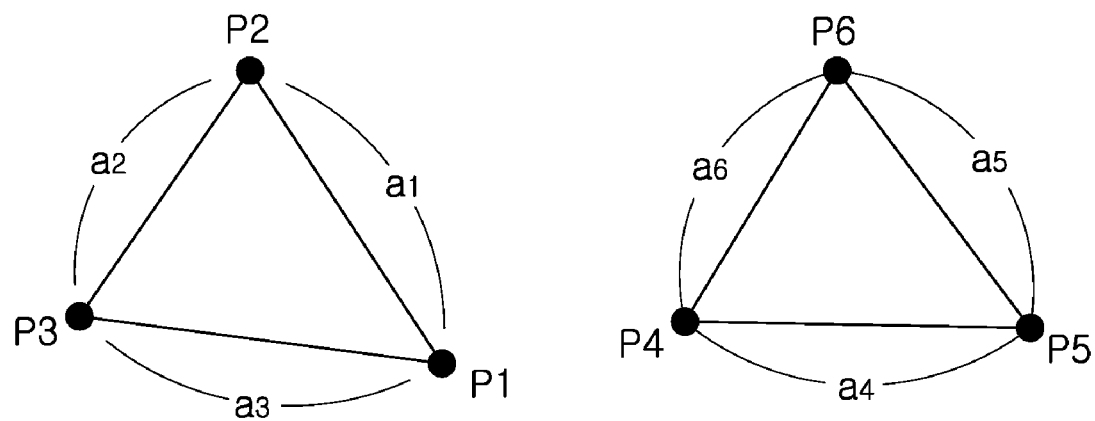
FIG. 4 is a view illustrating an example of an input image of a front camera including a correction plate marked with a triangle pattern according to an exemplary embodiment of the present invention.
Figure 5:
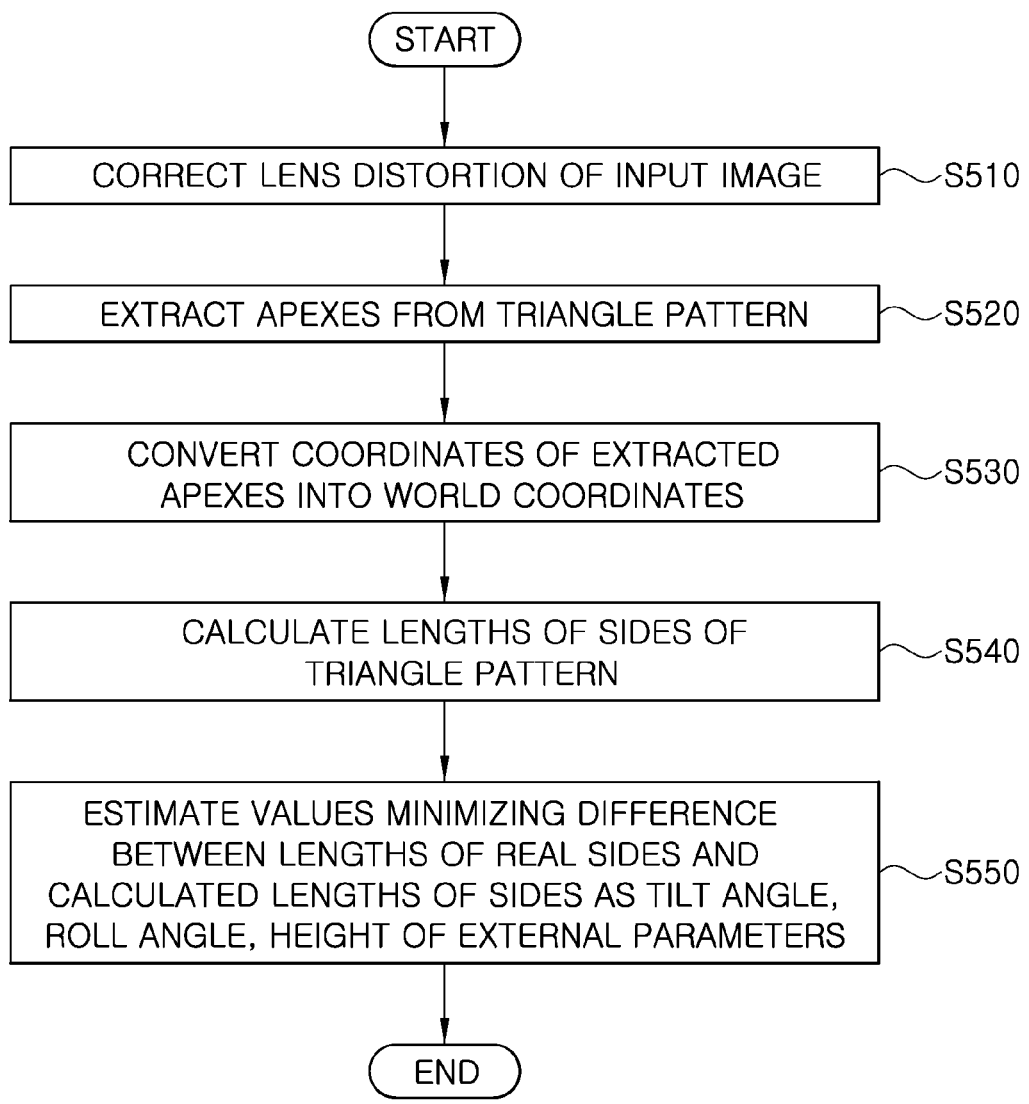
FIG. 5 is a flowchart to illustrate a method for estimating camera external parameters according to an exemplary embodiment of the present invention.

FIG. 4 is a view illustrating an example of an input image of a front camera including a correction plate marked with a triangle pattern according to an exemplary embodiment of the present invention, and FIG. 5 is a flowchart to illustrate a method for estimating camera external parameters according to an exemplary embodiment of the present invention.

Referring to FIG. 4, an image which is captured by the front camera 210 and is input may include two correction plates PL1 and PL2 marked with triangle patterns. Even when the real triangle pattern marked on the correction plates PL1 and PL2 is an equilateral triangle having sides of length A, the triangle pattern of the input image have sides of different lengths ($a_1$, $a_2$, $a_3$, $a_4$, $a_5$, and $a_6$) due to the lens distortion, tilt angle (Ψ), roll angle (Φ), and height (z) of the front camera 210.

However, when the lens distortion in the input image captured by the front camera 210 is corrected in a well-known method, and the input image is converted into an image of a virtual camera having a virtual viewpoint in a direction of looking down to the ground (G) from the top of the vehicle (V) (top view), the sides of the triangle patterns PL1 and PL2 have the same length ($a_1$, $a_2$, $a_3$, $a_4$, $a_5$, and $a_6$).

When the following operations are performed with respect to the image input from the front camera 210 based on this, the tilt angle (Ψ), roll angle (Φ), and height (z) of the front camera 210 can be estimated.

FIG. 5 is a flowchart to illustrate a method for estimating a tilt angle, a roll angle, and a height from among the camera external parameters according to an exemplary embodiment of the present invention.

Referring to FIG. 5, the external parameter estimating apparatus 100 corrects lens distortion of the image input by the front camera 210 (S510). Thereafter, the external parameter estimating apparatus 100 extracts 6 apexes (P1, P2, P3, P4, P5, and P6) from the triangle patterns marked on the front left correction plate PL1 and the front right correction plate PL2 included in the image captured by the front camera, that is, 3 apexes from each triangle pattern (S520).

Next, the external parameter estimating apparatus 100 converts coordinates of the 6 apexes (P1, P2, P3, P4, P5, and P6) into world coordinates while changing the tilt angle (Ψ), roll angle (Φ), and height (z) of the front camera 210 (S530). The world coordinates may regard a certain reference point or a point (0) on the ground (G) where the center of the vehicle (V) is located, as a coordinate reference point.

The external parameter estimating apparatus 100 calculates the lengths ($a_1$, $a_2$, $a_3$, $a_4$, $a_5$, and $a_6$) of the sides of the triangle patterns marked on the front left correction plate PL1 and the front right correction plate PL2 by using the world coordinates of the 6 apexes (P1, P2, P3, P4, P5, and P6) obtained in operation S530 (S540).

Finally, the external parameter estimating apparatus 100 may estimate a tilt angle (Ψ), a roll angle (Φ), and a height (z), which minimize a difference between the length A of the real sides of the triangle patterns and the lengths ($a_1$, $a_2$, $a_3$, $a_4$, $a_5$, and $a_6$) of the sides of the triangle patterns calculated in operation S540, as the tilt angle ($\Psi_F$), roll angle ($\Phi_F$), and height ($z_F$) of the front camera 210 (S550). In operation S550, the tilt angle ($\Psi_F$), roll angle ($\Phi_F$), and height ($z_F$) minimizing a value which is obtained by Equation 1, f(Ψ, Φ, z), are obtained:

$$f(\Psi, \Phi, z) = \sum_{i=1}^{6} (A - a_i)^2 \qquad \text{Equation 1}$$

In the same way as described above, the tilt angle (Ψ), roll angle (Φ), and height (z) of the other cameras, the rear camera 220, the right camera 230, and the left camera 240, may be estimated.

Hereinafter, a method for estimating location coordinates (x, y) and a pan angle (θ) of the cameras 210, 220, 230, and 240 will be explained.

Figure 6:
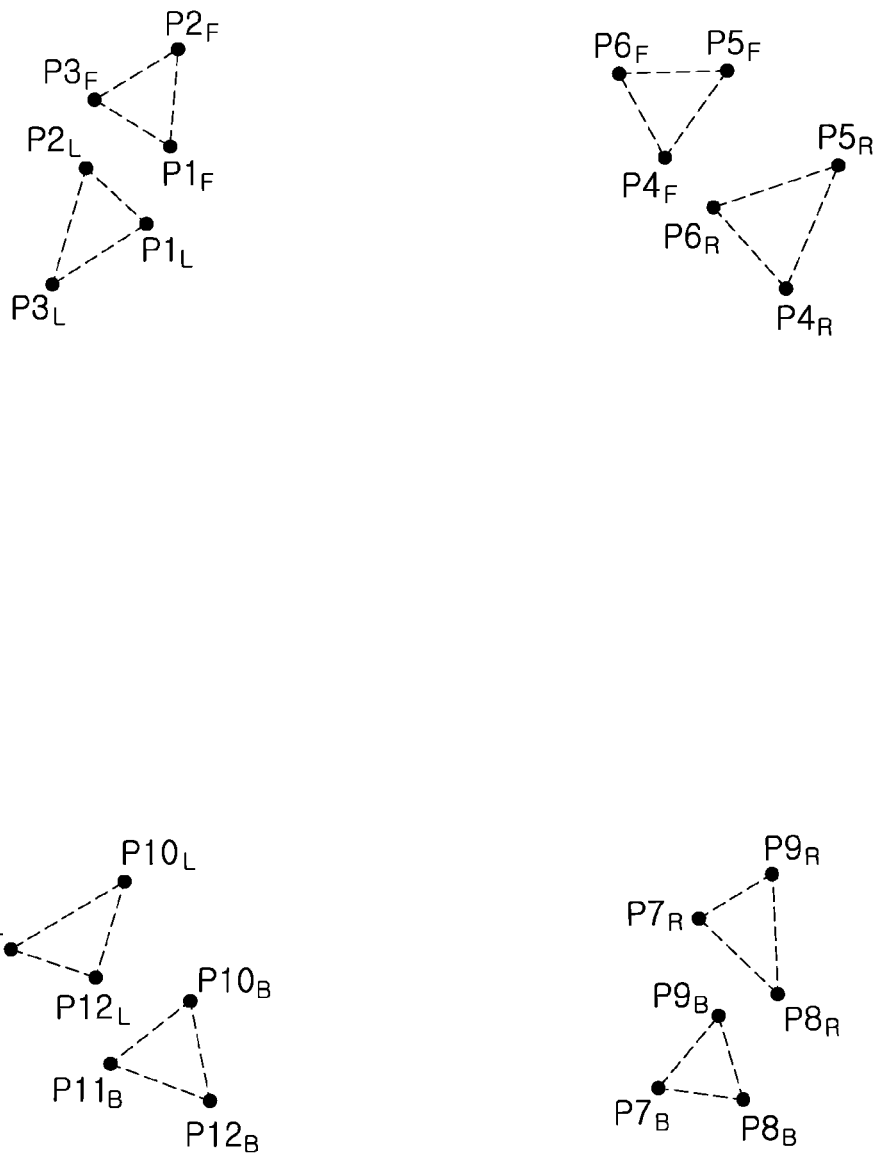
FIG. 6 is a view illustrating apexes extracted from images captured by front, rear, left and right cameras according to an exemplary embodiment of the present invention.

FIG. 6 is a view illustrating apexes extracted from images captured by the front, rear, left, and right cameras according to an exemplary embodiment of the present invention.

Referring to FIG. 6, apexes $P1_F$, $P2_F$, and $P3_F$ are three apexes which are extracted from the image captured by the front camera 210 for the front left correction plate PL1, and apexes $P4_F$, $P5_F$, and $P6_F$ are three apexes which are extracted from the image captured by the front camera 210 for the front right correction plate PL2. In addition, apexes $P4_R$, $P5_R$, and $P6_R$ are three apexes which are extracted from the image captured by the right camera 230 for the front right correction plate PL2, and apexes $P7_R$, $P8_R$, and $P9_R$ are three apexes which are extracted from the image captured by the right camera 230 for the rear right correction plate PL3. In addition, apexes $P7_B$, $P8_B$, and $P9_B$ are three apexes which are extracted from the image captured by the rear camera 220 for the rear right correction plate PL3, and apexes $P10_B$, $P11_B$, and $P12_B$ are three apexes which are extracted from the image captured by the rear camera 210 for the rear left correction plate PL4. Finally, apexes $P10_L$, $P11_L$, and $P12_L$ are three apexes which are extracted from the image captured by the left camera 230 for the rear left correction plate PL4, and apexes $P1_L$, $P2_L$, and $P3_L$ are three apexes which are extracted from the image captured by the left camera 240 for the front left correction plate PL1.

Figure 7:
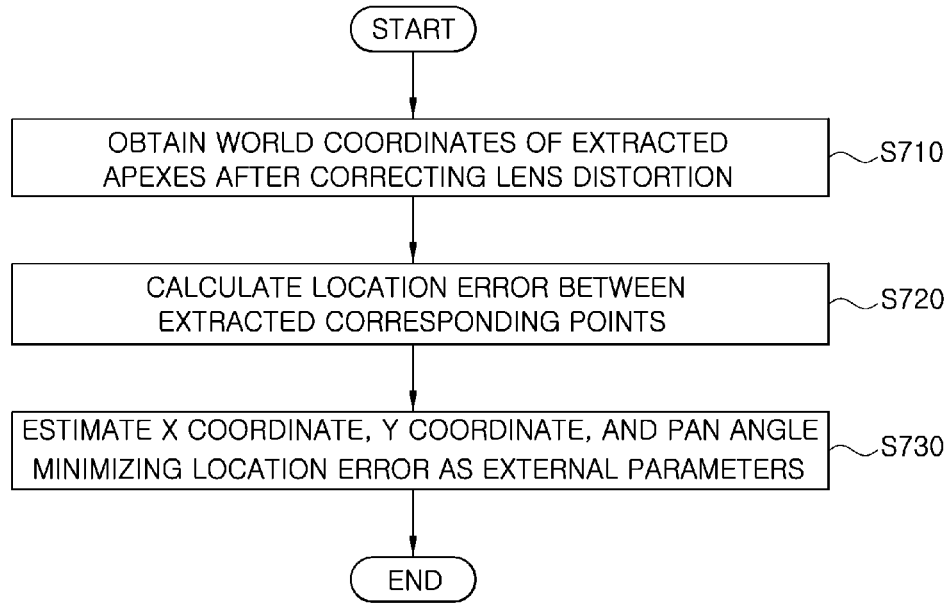
FIG. 7 is a flowchart to illustrate a method for estimating a pan angle, a x-coordinate, and a y-coordinate from among camera external parameters according to an exemplary embodiment of the present invention.

FIG. 7 is a flowchart to illustrate a method for estimating a pan angle, an x-coordinate, and a y-coordinate from among the camera external parameters according to an exemplary embodiment of the present invention.

Referring to FIG. 7, world coordinates may be obtained for the apexes which are extracted from the images captured by the cameras 210, 220, 230, and 240 after the lens distortion is corrected (S710). In operation S710, the tilt angle (Ψ), roll angle (Φ), and height (z) of the cameras 210, 220, 230, and 240 use the values which are estimated in the above-described method, and the location coordinates (x, y) and the pan angle (θ) may be set to pre-defined initial values.

For example, the pan angles (θ) of the front camera 210, the left camera 240, the rear camera 220, and the right camera 230 may be set to 0°, 90°, 180°, and 270°, respectively. The location coordinates (x, y) may be set to an initial value which is obtained by considering the case in which the cameras 210, 220, 230, and 240 are installed on the exact locations with reference to the center (O) of the vehicle as the coordinate reference points. When the cameras 210, 220, 230, and 240 are installed on the pre-defined exact reference locations and orientations, world coordinates of corresponding points of the apexes (P1$_F$, P2$_F$, and P3$_F$) and the apexes (P1$_L$, P2$_L$, and P3$_L$), which are obtained in operation S710, are consistent with each other. Therefore, there is no location error. However, since there may be an error during the real camera mounting process or driving process, there may be a location error between the corresponding points. The location error may be defined by a distance between the corresponding points with reference to the world coordinates.

Thereafter, the external parameter estimating apparatus 100 calculates the location error between the corresponding points while changing the location coordinates (x, y) and the pan angle (θ) of the cameras 210, 220, 230, and 240 (S720).

Finally, the external parameter estimating apparatus 100 may estimate values which minimize the location error between the corresponding points as the location coordinates (x, y) and the pan angle (θ) of the cameras 210, 220, 230, and 240 (S730). In operation S730, the location coordinates (x, y) and the pan angle (θ) which minimize a value obtained by Equation 2, that is, $f(\theta_F, \theta_B, \theta_L, \theta_R, x_D, x_B, x_L, x_R, y_F, y_B, y_L, y_R)$, are obtained:

$$f(\theta_F, \theta_B, \theta_L, \theta_R, x_F, x_B, x_L, x_R, y_F, y_B, y_L, y_R) = \sum_{i=1}^{12}(D_i)^2 \quad \text{Equation 2}$$

Di is a distance between corresponding points from among the apexes extracted from images captured by different cameras. For example, D1 is a distance between the apex P1$_F$ and the apex P1$_L$.

In the above-described method, the relative external parameters of each of the cameras 210, 220, 230, and 240 can be estimated, and, when absolute location and position of one of the cameras 210, 220, 230, and 240 are known, absolute locations and positions of the other cameras can be obtained. When the location of one of the cameras 210, 220, 230, and 240 is set as the reference point of the world coordinates, the absolute locations and positions of the other cameras can be obtained. The absolute locations and positions of the cameras mounted on the vehicle may be obtained in other methods in addition to the above-described method.

Hereinafter, a method for creating a 3D image of vehicle surroundings according to an exemplary embodiment of the present invention will be explained.

Figure 8:
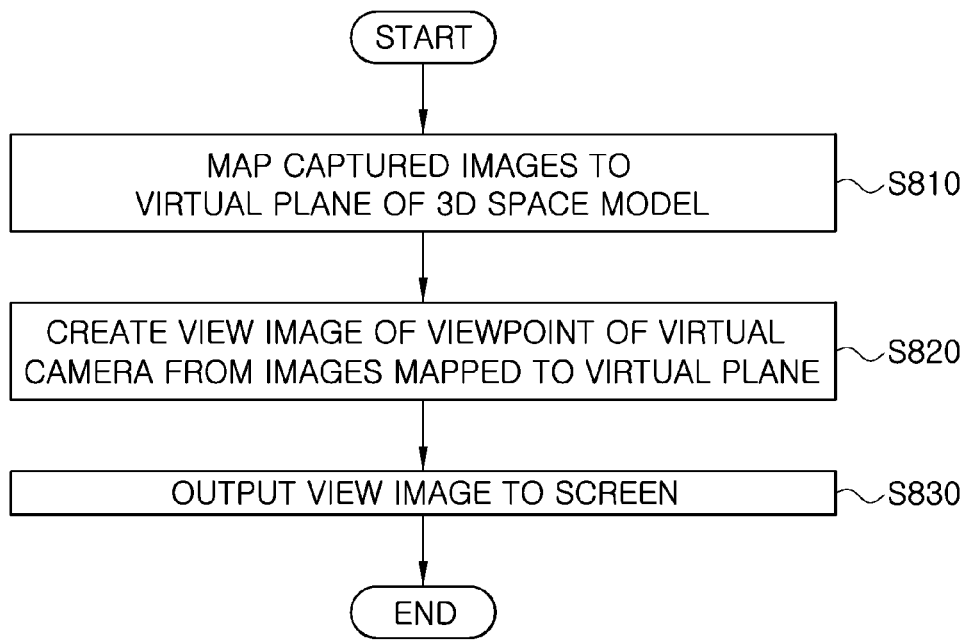
FIG. 8 is a flowchart to illustrate a method for creating a 3D image of vehicle surroundings according to an exemplary embodiment of the present invention.

FIG. 8 is a flowchart to illustrate a method for creating a 3D image of vehicle surroundings according to an exemplary embodiment of the present invention.

Referring to FIG. 8, the surrounding image creating apparatus 300 may map the images captured by the cameras 210, 220, 230, and 240 to the virtual plane defined by the 3D space model (S810). In operation S810, the 3D space model may use a model (M) having a virtual plane of a vessel shape which has a flat bottom surface (A) and has a radius gradually increasing toward the top, as shown in FIGS. 9A to 9C.

Figure 9A:
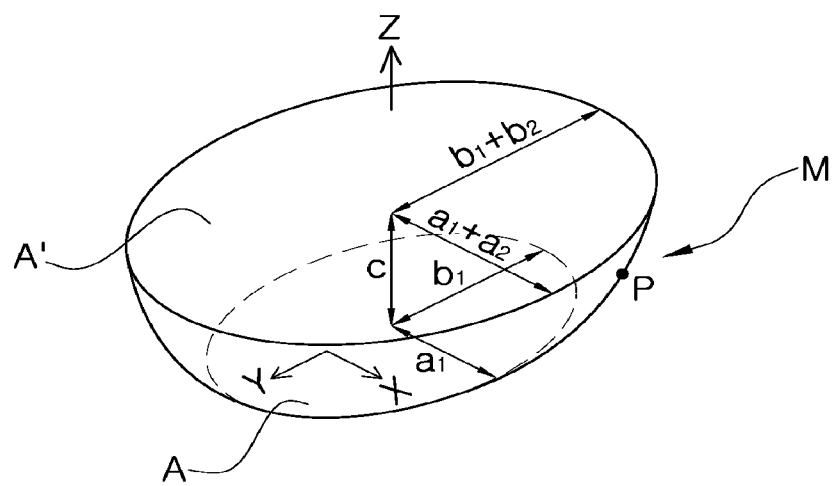
FIGS. 9A to 9C are views to illustrate a 3D space model according to an exemplary embodiment of the present invention.

Referring to FIG. 9A, the 3D space model (M) is defined as having the bottom surface A having a long radius (b$_1$) and a short radius (a$_1$) and having the radius increasing toward the top, thereby having a long radius (b$_1$+b$_2$) and a short radius (a$_1$+a$_2$) on the opened top surface (A') at the height of C. Of course, the bottom surface and the top surface may be implemented in a circular shape according to an exemplary embodiment.

Figure 9B:
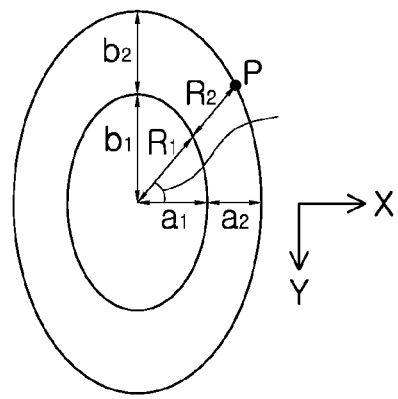
Figure 9C:
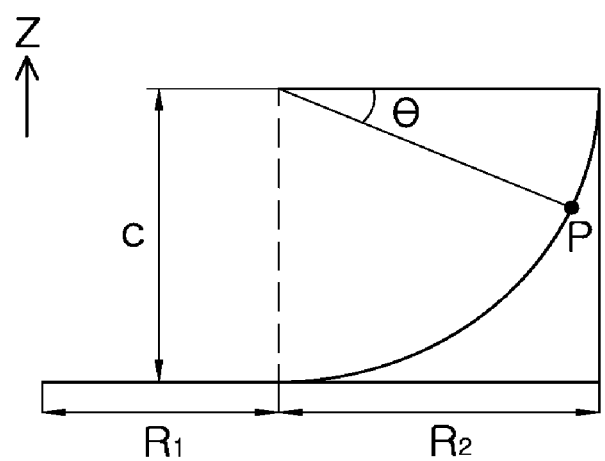

Referring to FIGS. 9B and 9C, a point P on the 3D space model is located on a virtual plane which is obtained by Equation 3 when the point P forms an angel of φ with the X-axis and forms an angle of θ with the top surface (A'):

$$\alpha(a_1\cos\varphi, b_1\sin\varphi, 0), \text{ for } \leq 1\frac{x^2}{a_1^2} + \frac{y^2}{b_1^2} \leq 1 \quad \text{Equation 3}$$

$$((a_1 + a_2)\cos\theta\cos\varphi, (b_1 + b_2)\cos\theta\sin\varphi, c\sin\theta),$$

$$\text{for } \frac{x^2}{a_1^2} + \frac{y^2}{b_1^2} > 1$$

where 'α' is a parameter related to the size of the bottom surface. When 'α' is 0, there is no bottom surface, and, when 'α' is 1, the bottom surface has the long radius (b$_1$) and the short radius (a$_1$). The size of the bottom surface may be adjusted by adjusting 'α' and may be set by a system designer or may be changed according to a vehicle driving condition or a driving speed as explained below.

Figure 10:
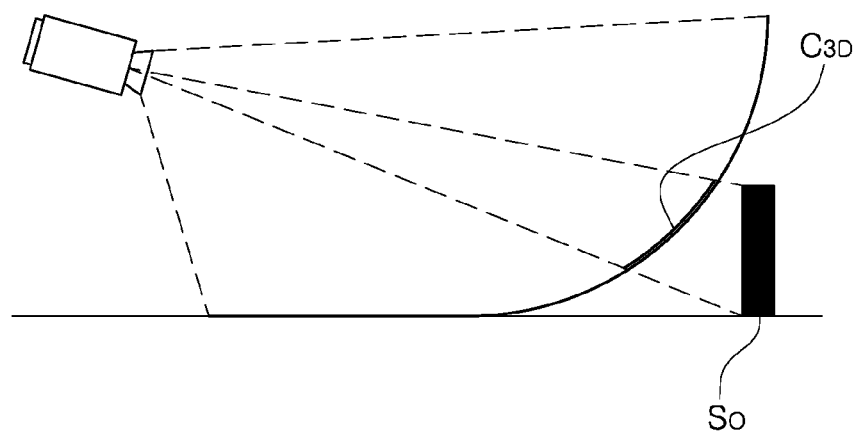
FIG. 10 is a view to illustrate an example of a method for mapping a image captured by a real camera to a virtual plane of a 3D space model according to an exemplary embodiment.

FIG. 10 is a view to illustrate an example of a method for mapping an image captured by a real camera to a virtual plane of a 3D space model according to an exemplary embodiment of the present invention.

Referring to FIG. 10, an object (S$_O$) standing around the vehicle may be projected to a 3D curved surface section (C$_{3D}$) rather than a bottom surface parallel to the ground. Accordingly, the object may lengthen when being projected to a 2D plane, but, the object can be prevented from lengthening by being projected to the 3D curved surface section.

There are the following advantages when the model having the virtual plane of the vessel shape which has the flat bottom surface and the radius gradually increasing toward the top is used as the 3D space model.

A mismatching phenomenon which may be caused by parallax does not occur on the flat bottom surface. A certain surrounding area of the vehicle should indicate a pattern appearing on the ground. As such, a predetermined portion may be close to the ground to show a good result.

In addition, the size of the bottom surface of the 3D space model may be easily controlled only by adjusting a long/short radius coefficient of an oval corresponding to the bottom surface. Accordingly, the mapping virtual plane can be easily adjusted according to how far an interested surrounding area is set to be away from the vehicle. For example, when the driver parks the vehicle or drives slowly, it is necessary for the user to check the bottom surface around the vehicle. In this case, increasing the size of the bottom surface of the 3D space model is more advantageous. To the contrary, when the driver drives at high speed, it is necessary for the user to check a long distance from the vehicle. In this case, reducing the size of the bottom surface of the 3D space model is more advantageous. Accordingly, the surrounding image creating apparatus 300 may adjust the size of the bottom surface of the 3D space model in inverse proportion to the driving speed.

In addition, since the 3D space model according to an exemplary embodiment of the present invention is smoothly changed without an abruptly curved line, the view image can be seen naturally without an unnaturally curved portion. Finally, it is easy to determine a location of a fiducial point on the mapping virtual plane in mapping the input images. The fiducial point may be determined according to how much interval is set for $\theta$ and $\Psi$ in the above Equation.

Referring back to FIG. 8, the surrounding image creating apparatus 300 creates a view image of the viewpoint of the virtual camera by using the images mapped to the virtual plane after operation S810 (S820). In operation S820, the view image of the viewpoint of the virtual camera may be created by referring to a lookup table in which a corresponding relationship between the image mapped to the virtual plane and the view image of the viewpoint of the virtual camera is pre-defined, or by using a function defining the corresponding relationship between the image mapped to the virtual plane and the view image of the viewpoint of the virtual camera.

The viewpoint of the virtual camera may be determined according to at least one of a vehicle driving condition and a user selection.

More specifically, the viewpoint of the virtual camera may be determined according to the vehicle driving condition in association with a vehicle speed, a steering angle direction or a gear location. For example, when the vehicle is driven forward at more than a predetermined speed, the viewpoint of the virtual camera may be set to the front direction of the vehicle parallel to the ground or may be set to have a small tilt angle ($\Psi$) with respect to the ground. To the contrary, when the vehicle is driven forward at lower than the predetermined speed, the viewpoint of the virtual camera may be set to have a great tilt angle ($\Psi$) with respect to the ground. In addition, when the gear of the vehicle is a reverse gear, the viewpoint of the virtual camera may be set to the rear direction. In addition, when the steering angle direction of the vehicle is the left direction, the viewpoint of the virtual camera may be set to the front left direction of the vehicle, and, when the steering angle direction of the vehicle is the right direction, the viewpoint of the virtual camera may be set to the front right direction of the vehicle.

Hereinafter, a method for determining a viewpoint of a virtual camera according to a user selection will be explained with reference to FIGS. 11A to 11C.

Figure 11A:
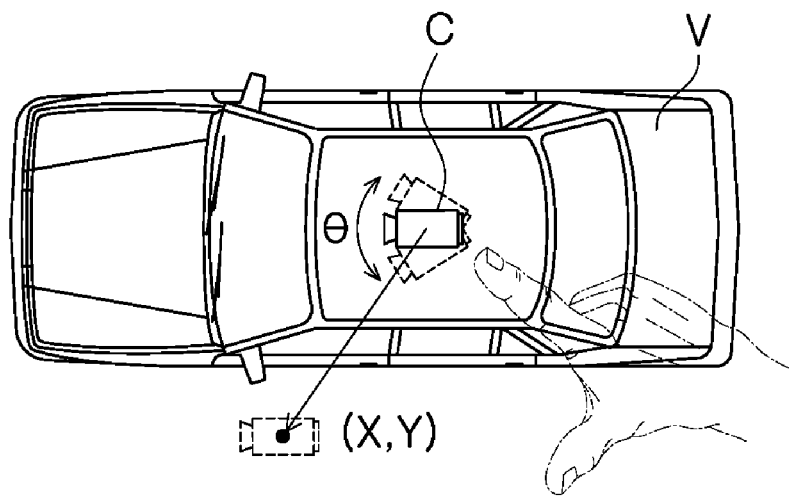
FIGS. 11A to 11C are views to illustrate a method for determining a virtual camera viewpoint according to a user selection according to an exemplary embodiment of the present invention.

Referring to FIG. 11A, when the user selects a virtual camera viewpoint setting menu, a User Interface (UI) screen on which a virtual camera is displayed is provided in the form of looking down to the vehicle from the top. Then, the user may adjust the pan angle ($\theta$) of the virtual camera by rotating the front of the virtual camera (C), and may move the virtual camera (C) to a desired location (X, Y) by dragging it.

Figure 11B:
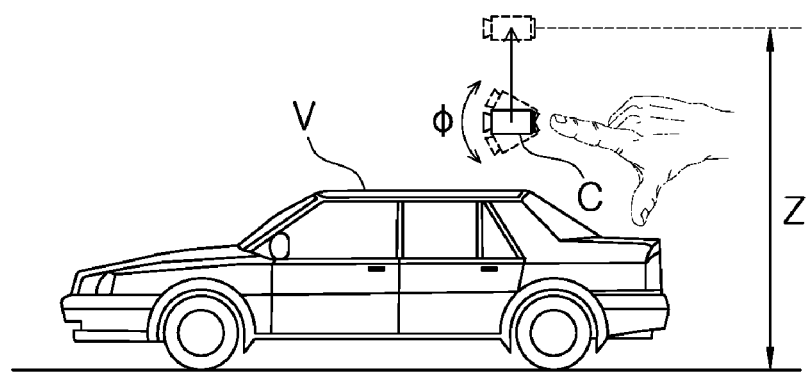

As shown in FIG. 11B, the UI screen on which the virtual camera (C) is displayed may be provided in the form of viewing the vehicle (V) from the side. Through this UI screen, the user may adjust the tilt angle ($\Psi$) by rotating the front of the virtual camera (C) and may adjust the height (z) of the virtual camera (C) by dragging the virtual camera (C).

Figure 11C:
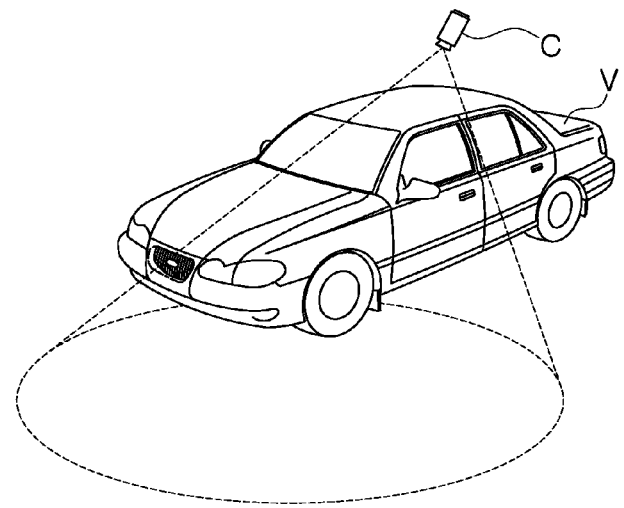

When the viewpoint of the virtual camera is set by the user in the above-described method, a screen from which the user can understand the viewpoint of the virtual camera 3-dimensionally may be provided as shown in FIG. 11C.

An area where the images captured by the plurality of cameras 210, 220, 230, and 240 to create the view image overlap with one another may be processed as follows.

Figure 12A:
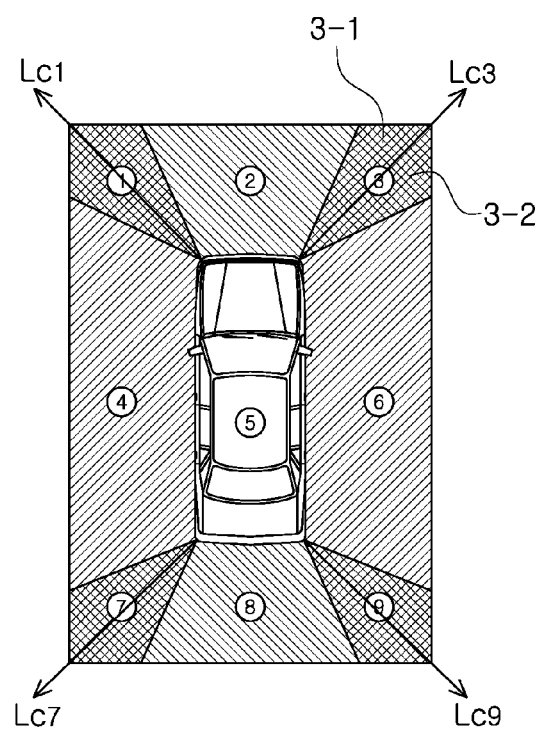
FIGS. 12A and 12B are views to illustrate an area where images captured by a plurality of cameras overlap with one another when a view image of a virtual camera viewpoint is created.
Figure 12B:
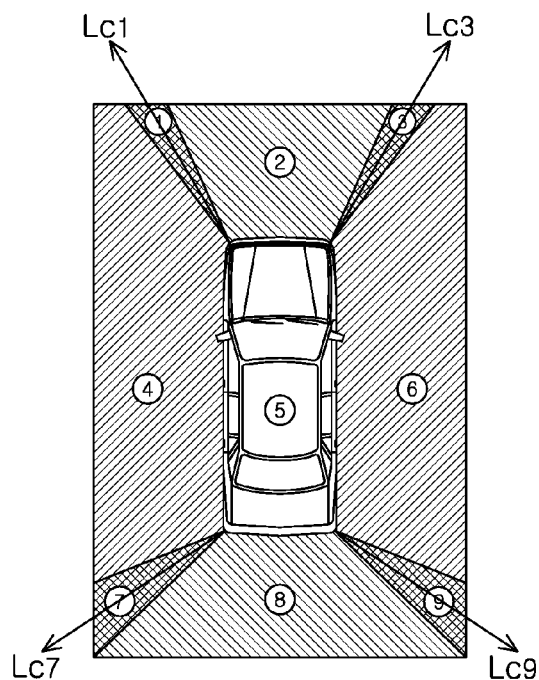

FIGS. 12A and 12B are views to illustrate an area where images captured by a plurality of cameras overlap with one another when a view image of a viewpoint of a virtual camera is created.

Referring to FIG. 12A, when the viewpoint of the virtual camera is set to a direction of looking down to the ground from the top of the vehicle in a vertical direction (when the tilt angle of the virtual camera is 90°), the images captured by the front camera 210 may be mapped to $1^{st}$, $2^{nd}$, and $3^{rd}$ areas, and the images captured by the rear camera 220 may be mapped to $7^{th}$, $8^{th}$, and $9^{th}$ areas. In addition, the images captured by the left camera 230 may be mapped to $1^{st}$, $4^{th}$, and $7^{th}$ areas, and the images captured by the right camera 240 may be mapped to $3^{rd}$, $6^{th}$, and $9^{th}$ areas. Herein, the $1^{st}$, $3^{rd}$, $7^{th}$, and $9^{th}$ areas are overlapping areas where the images captured by the plurality of cameras overlap with one another. That is, the $1^{st}$ area is an overlapping area where the image captured by the front camera 210 and the image captured by the left camera 230 overlap with each other, and the $3^{rd}$ area is an overlapping area where the image captured by the front camera 210 and the image captured by the right camera 240 overlap with each other. In addition, the $7^{th}$ area is an overlapping area where the image captured by the rear camera 220 and the image captured by the left camera 230 overlap with each other, and the $9^{th}$ area is an overlapping area where the image captured by the rear camera 220 and the image captured by the right camera 240 overlap with each other. The $5^{th}$ area is an area where an image corresponding the vehicle is displayed. Centers $L_{C1}$, $L_{C3}$, $L_{C7}$, and $L_{C9}$ of the overlapping area are located in a diagonal direction of the vehicle.

The overlapping area is processed by being divided into areas with reference to the center $L_{C1}$, $L_{C3}$, $L_{C7}$, and $L_{C9}$ of the overlapping area. For example, the overlapping area 3 is divided into an area 3-1 and an area 3-2, and the image captured by the front camera 210 is applied to the area 3-1 and the image captured by the right camera 240 is applied to the area 3-2. A different weight may be given with reference to the center $L_{C3}$ of the overlapping area. For example, a higher weight may be given to the image captured by the front camera 210 in the area 3-1, and a higher weight may be given to the image captured by the right camera 240 in the area 3-2. The other overlapping areas are processed in the same method.

On the other hand, when the viewpoint of the virtual camera is set to a direction of looking ahead from the rear of the vehicle (when the tilt angle of the virtual camera is less than 90°), the centers $L_{C1}$ and $L_{C3}$ of the overlapping areas are close to a vertical axis direction of the vehicle. In general, the viewpoint of the virtual camera is set to the direction of looking ahead from the rear of the vehicle when the vehicle is driven. In this case, the user needs to check blind spots on the left and right sides naturally and easily. To achieve this, the center of the overlapping area is processed to be close to the lengthwise direction of the vehicle so that more images captured by the left and right cameras 230 and 240 can be reflected to the view image.

In addition, the center of the overlapping area may be changed to further include an image captured by a camera installed on a location where the virtual camera is located according to how far the location of the viewpoint of the virtual camera is moved to the left or right. For example, as the location of the viewpoint of the virtual camera goes further to the left, the center $L_{C1}$ and $L_{C7}$ of the overlapping areas may be changed to be closer to the vertical direction of the vehicle. To the contrary, as the location of the viewpoint of the virtual camera goes further to the right, the centers $L_{C3}$ and $L_{C9}$ of the overlapping area may be changed to be closer to the lengthwise direction of the vehicle.

Finally, the view image of the viewpoint of the virtual camera created in operation S820 is output to the display apparatus 400 (S830).

In addition, the operations 810 to 830 may be repeated while changing the centers $L_{C1}$, $L_{C3}$, $L_{C7}$, and $L_{C9}$ of the overlapping areas and the size of the bottom surface of the 3D space model according to the vehicle driving condition. According to an exemplary embodiment, the view image may be fixed according to the viewpoint of the virtual camera set by the user and may not be affected by the vehicle driving condition.

Figure 13:
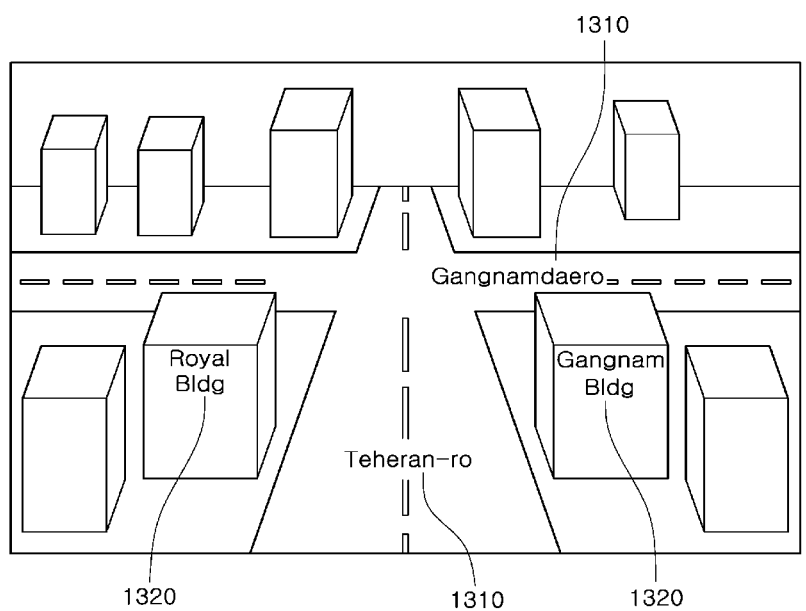
FIG. 13 is a view illustrating a view image of a virtual camera viewpoint on which information on buildings and roads around a vehicle is displayed according to an exemplary embodiment of the present invention.

According to an exemplary embodiment, the surrounding image creating apparatus 300 may interwork with a Global Positioning System (GPS) receiving module (not shown) to receive current driving location information of the vehicle. In addition, the surrounding image creating apparatus 300 may interwork with a DB of information on buildings and roads around the current driving vehicle, and may add the information on the surrounding buildings and roads to the view image of the viewpoint of the virtual camera, thereby implementing augmented reality. FIG. 13 is a view illustrating a view image of a viewpoint of a virtual camera on which surrounding building information 1320 and road information 1310 of the vehicle are displayed according to an exemplary embodiment of the present invention.

The GPS receiving module may use a GPS receiving apparatus included in a wireless communication terminal when the surrounding image creating apparatus 300 is mounted on the wireless communication terminal such as a smartphone, or may be implemented as a separate GPS receiving module installed in the vehicle. In addition, the DB of the information of the surrounding buildings and roads of the vehicle may be stored in an internal memory of the surrounding image creating apparatus 300 or may be provided from a separate navigation system (not shown) connected to the surrounding image creating apparatus 300. When the surrounding image creating apparatus 300 is equipped with a network communication module such as 3G, 4G, etc., or is mounted on the smartphone, the DB may be transmitted from an external DB server.

The exemplary embodiments of the present invention include a computer-readable medium including a program command for performing operations implemented by various computers. This medium records a program for performing the above-described method for creating the 3D image of the vehicle surroundings. This medium may include a program command, a data file, a data structure, etc. separately or in combination. An example of this medium may include a magnetic medium such as a hard disk, a floppy disk, and a magnetic tape, an optical recording medium such as a Compact Disk (CD) and a Digital Versatile Disk (DVD), and a hardware device configured to store and execute a program command, such as a floptical disk and a magnetic-optical medium, a Read Only Memory (ROM), a Random Access Memory (RAM), and a flash memory. In addition, this medium may be a transmitting medium of light including a carrier wave for transmitting a signal designating a program command, a data structure, etc., a metal wire, a waveguide, etc. An example of the program command includes not only a mechanical code created by a compiler but also a high level language code executable by a computer by using an interpretable.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

INDUSTRIAL APPLICABILITY

The present invention may be used in a method and apparatus for creating and providing an image of vehicle surroundings 3-dimensionally.

The invention claimed is:

1. A method for creating a 3D image of vehicle surroundings, the method comprising:
   mapping images captured by a plurality of cameras installed in a vehicle to a virtual plane defined by a 3D space model of a vessel shape which has a flat bottom surface and a radius increasing toward a top; and
   creating a view image of a viewpoint of a virtual camera by using the images mapped to the virtual plane,
   wherein a size of the bottom surface of the 3D space model is in inverse proportion to a driving speed of the vehicle.

2. The method of claim 1, wherein the viewpoint of the virtual camera is determined according to at least one of a driving condition of the vehicle and a user selection.

3. The method of claim 1, wherein the view image is created with reference to a lookup table in which a corresponding relationship between the image mapped to the virtual plane and the view image of the viewpoint of the virtual camera is pre-defined.

4. The method of claim 1, wherein a center of an area where the images captured by the plurality of cameras to create the view image overlap with one another is changed according to a tilt angle of the virtual camera.

5. The method of claim 1, wherein the plurality of cameras comprise a front camera, a right camera, a rear camera, and a left camera installed on a front, a right, a rear, and a left of the vehicle, respectively, and
   wherein a center of an overlapping area where the images captured by the plurality of cameras to create the view image overlap with one another is changed to further comprise an image captured by the virtual camera according to how far the virtual camera is distanced from a center of the vehicle to the left or right.

6. The method of claim 2, wherein the viewpoint of the virtual camera interworks with a steering angle direction or a gear location of the vehicle.

7. The method of claim 2, further comprising:
   displaying a user interface (UI) for receiving a user selection regarding the viewpoint of the virtual camera; and
   displaying a change in the viewpoint of the virtual camera according to a user selection input through the UI.

8. The method of claim 2, further comprising adding information on buildings and roads around a driving location of the vehicle to the view image according to the viewpoint of the virtual camera.

9. A system for displaying an image of vehicle surroundings, the system comprising a surrounding image creating apparatus configured to receive images captured by a plurality of cameras installed in a vehicle, map the images to a virtual plane defined by a 3D space model of a vessel shape which has a flat bottom surface and a radius increasing toward a top, and create a view image viewed from a viewpoint of a virtual camera by using the images mapped to the virtual plane,
   wherein a size of the bottom surface of the 3D space model is in inverse proportion to a driving speed of the vehicle.

10. The system of claim 9, wherein the surrounding image creating apparatus adds information on buildings and roads around a driving location of the vehicle to the view image according to the viewpoint of the virtual camera.

11. The system of claim 9, wherein the plurality of cameras transmit the captured images to the surrounding image creating apparatus via short-range wireless communication.

* * * * *